(12) United States Patent
Stalsberg

(10) Patent No.: US 6,665,625 B2
(45) Date of Patent: Dec. 16, 2003

(54) ENERGY-BASED THRESHOLDS APPLIED DYNAMIC BALANCING

(75) Inventor: Kevin J. Stalsberg, White Bear Lake, MN (US)

(73) Assignee: Honeywell International Inc, Morristown, NJ (US)

( * ) Notice: Subject to any disclaimer, the term of this patent is extended or adjusted under 35 U.S.C. 154(b) by 112 days.

(21) Appl. No.: 09/951,798

(22) Filed: Sep. 10, 2001

(65) Prior Publication Data

US 2003/0088377 A1 May 8, 2003

(51) Int. Cl.[7] .......................... G01C 19/00; G01M 1/00
(52) U.S. Cl. .................... 702/104; 702/101; 702/102; 702/179; 73/458; 73/468; 8/158; 8/159
(58) Field of Search ................... 702/101, 104, 702/102, 179, 33, 36, 41, 43, 44, 105, 113–115, 141, 142, 145–148, 150, 151, 175, 183, 184, 189; 73/458, 468; 68/23.1, 23.2, 24; 8/158, 159; 700/302, 305

(56) References Cited

U.S. PATENT DOCUMENTS

| | | | |
|---|---|---|---|
| 3,799,348 A | 3/1974 | Mazza | 210/144 |
| 3,983,035 A | 9/1976 | Arkeveld et al. | 210/138 |
| 4,000,658 A | 1/1977 | Schmidt | 73/490 |
| 4,157,781 A | 6/1979 | Maruyama | 233/23 A |
| 4,322,641 A | 3/1982 | Packard | 307/521 |
| 4,694,156 A | 9/1987 | Swanberg | 250/214 |
| 4,991,247 A | 2/1991 | Castwall et al. | 8/158 |
| 5,150,314 A | 9/1992 | Garratt et al. | 364/571.02 |
| 5,280,660 A | 1/1994 | Pellerin et al. | 8/158 |
| 5,325,677 A | 7/1994 | Payne et al. | 68/12.04 |
| 5,490,436 A | 2/1996 | Coyne et al. | 74/573 |
| 5,561,993 A | 10/1996 | Elgersma et al. | 68/23.2 |
| 5,582,040 A | 12/1996 | Khan | 68/23.2 |
| 5,692,313 A | 12/1997 | Ikeda et al. | 34/58 |
| 5,715,731 A | 2/1998 | Koch | 74/573 |
| 5,729,025 A | 3/1998 | Erickson et al. | 250/574 |
| 5,731,868 A | 3/1998 | Okey et al. | 356/73 |
| 5,757,481 A | 5/1998 | O'Brien et al. | 356/243 |
| 5,761,932 A | 6/1998 | Kim | 68/23.2 |
| 5,761,933 A | 6/1998 | Kim et al. | 68/23.2 |
| 5,765,402 A | 6/1998 | Ikeda et al. | 68/12.06 |
| 5,800,628 A | 9/1998 | Erickson et al. | 134/18 |
| 5,850,748 A | 12/1998 | Kim et al. | 68/23.2 |
| 5,862,553 A | 1/1999 | Haberl et al. | 8/159 |
| 5,870,907 A | 2/1999 | Cho | 68/23.1 |
| 5,893,280 A | 4/1999 | Honda et al. | 68/12.06 |
| 5,913,951 A | 6/1999 | Herr et al. | 8/158 |
| 5,921,148 A | 7/1999 | Howell | 74/573 |
| 5,923,433 A | 7/1999 | Giuffre et al. | 356/440 |
| 5,957,144 A | 9/1999 | Neff et al. | 134/56 D |
| 5,960,804 A | 10/1999 | Cooper et al. | 134/56 D |
| 5,979,236 A | 11/1999 | Hong et al. | 73/458 |
| 6,007,640 A | 12/1999 | Neff et al. | 134/18 |
| 6,029,300 A | 2/2000 | Kawaguchi et al. | 8/159 |
| 6,047,428 A | 4/2000 | Min | 8/159 |
| 6,077,423 A | 6/2000 | Roy et al. | 210/121 |
| 6,082,151 A | 7/2000 | Wierzba et al. | 68/23.2 |
| 6,129,768 A | 10/2000 | Johnson et al. | 8/159 |
| 6,130,928 A | 10/2000 | Jamzadeh et al. | 377/23 |
| 6,144,447 A | 11/2000 | Ohman et al. | 356/246 |
| 6,148,647 A | 11/2000 | Kabeya et al. | 68/140 |
| 6,159,384 A | 12/2000 | Roberts et al. | 210/741 |

FOREIGN PATENT DOCUMENTS

| EP | 1 036 875 A2 | 9/2000 | D06F/39/08 |
|---|---|---|---|

Primary Examiner—John Barlow
Assistant Examiner—Meagan Walling

(57) ABSTRACT

A method and system for dynamically balancing a rotating system or rotating device utilizing energy-based threshold measurements, wherein the rotating system contains sensors therein. Sensor measurements are compiled from the sensors. The sensor measurements contain data indicative of the dynamics of the rotating system. The sensor measurements are converted to signal energy values associated with the rotating system. The signal energy values are then compared to energy threshold values to thereby determine a proper course of balancing corrections necessary to dynamically place the rotating system in a balanced state. Additionally, a displacement profile may be generated in response to compiling sensor measurements from the sensors. The displacement profile may be converted into force and acceleration values associated with a range of varying rotational speeds. Thereafter, the sensor measurements may be compared to the force values and acceleration values, thereby determining proper course for balancing corrections necessary to dynamically place the rotating system in a balanced state.

23 Claims, 8 Drawing Sheets

ENERGY-BASED THRESHOLDS APPLIED DYNAMIC BALANCING

RELATED APPLICATIONS

This application is related to co-pending and co-owned patent applications entitled: 'Method and Apparatus for Reducing Microprocessor Speed Requirements in Data Acquisition Applications,' Honeywell, U.S. Ser. No. 09/792,996, filed on Feb. 26, 2001; 'Method and System for Detecting Fluid Injection from Stationary to Rotating Members,' Honeywell, U.S. Ser. No. 09/951,790, filed on Sep. 10, 2001; 'Simultaneous Injection Method and System for a Self-Balancing Rotatable Apparatus,' Honeywell, U.S. Ser. No. 09/896,763, filed on Jun. 29, 2001; 'Dynamic Correlation Extension for a Self-Balancing Rotatable Apparatus' Honeywell, U.S. Ser. No. 09/951,932, filed on Sep. 10, 2001; 'Continuous Flow Method and System for Placement of Balancing Fluid on a Rotating Device Requiring Dynamic Balancing', Honeywell, U.S. Ser. No. 10/001,006, filed on Nov. 15, 2001; 'Dynamic Balancing Application Mass Placement', Honeywell, U.S. Ser. No. 10/001,090, filed on Nov. 15, 2001; 'Fixed-Bandwidth Correlation Window Method and System for a Self-Balancing Rotatable Apparatus,' Honeywell, U.S. Ser. No. 09/999,594, filed on Nov. 15, 2001; 'Supervisory Method and System for Improved Control Model Updates Applied to Dynamic Balancing,' Honeywell, U.S. Ser. No. 10/011,218, filed on Nov. 15, 2001; 'Data Manipulation Method and System for a Self-Balancing Rotatable Apparatus,' Honeywell, U.S. Ser. No. 10/000,882, filed on Nov. 15, 2001; 'Resonance Identification Extension for a Self-Balancing Rotatable Apparatus,' Honeywell, U.S. Ser. No. 10/001,098, filed on Nov. 15, 2001; 'Method and System for Mechanizing Simultaneous Multi-Actuator Actions Applied to Dynamic Balancing,' Honeywell, U.S. Ser. No. 10/000,255, filed on Nov. 15, 2001.

TECHNICAL FIELD

The present invention relates generally to rotatable members that are able to achieve balanced conditions throughout a range of rotational speeds. The present invention also relates to methods and symptoms for dynamically balancing rotatable members through the continual determination of out-of-balance forces and motion to thereby take corresponding counter balancing action. The present invention additionally relates to methods and systems in which inertial masses are actively placed within a rotating body in order to cancel rotational imbalances associated with the rotating body thereon. The present invention additionally relates to methods and system that establish consistent measurement thresholds applied to assessing the immediate balance condition for determining the course of dynamic balance control.

BACKGROUND OF THE INVENTION

Mass unbalance in rotating machinery leads to machine vibrations that are synchronous with the rotational speed. These vibrations can lead to excessive wear and to unacceptable levels of noise. Typical imbalances in large, rotating machines are on the order of one inch-pound.

It is a common practice to balance a rotatable body by adjusting a distribution of moveable, inertial masses attached to the body. Once certain types of bodies have been balanced in this fashion, they will generally remain in balance only for a limited range of rotational velocities. A tire, for instance, can be balanced once by applying weights to it. This balanced condition will remain until the tire hits a very large bump or the weights are removed. A centrifuge for fluid extraction, however, can change the amount of balance as more fluid is extracted.

Many machines are also configured as freestanding spring mass systems in which different components thereof pass through resonance ranges until the machine is out of balance. Additionally, such machines may include a rotating body flexibly located at the end of a shaft rather than fixed to the shaft as in the case of a tire. Thus moments about a bearing shaft may also be created merely by the weight of the shaft. A flexible shaft rotating at speeds above half of its first critical speed can generally assume significant deformations, which add to the imbalance. This often poses problems in the operation of large turbines and turbo generators.

Machines of this kind usually operate above their first critical speed. As a consequence, machines that are initially balanced at relatively low speeds may tend to vibrate excessively as they approach full operating speed. Additionally, if one balances to an acceptable level rather than to a perfect condition (which is difficult to measure), the small remaining out of balance will progressively apply force as the speed increases. This increase in force is due to the fact that $F\alpha r\omega^2$, (i.e., note that F is the out-of-balance force, r is the radius of the rotating body and ($\omega$ is its rotational speed).

The mass unbalance distributed along the length of a rotating body gives rise to a rotating force vector at each of the bearings that support the body. In general, the force vectors at respective bearings are not in phase. At each bearing, the rotating force vector may be opposed by a rotating reaction force, which can be transmitted to the bearing supports as noise and vibration.

The purpose of active, dynamic balancing is to shift an inertial mass to the appropriate radial eccentricity and angular position for canceling the net mass unbalance. At the appropriate radial and angular distribution, the inertial mass can generate a rotating centrifugal force vector equal in magnitude and phase to the reaction force referred to above.

Many different types of balancing schemes are known to those skilled in the art. When rotatable objects are not in perfect balance, nonsymmetrical mass distribution creates out-of-balance forces because of the centrifugal forces that result from rotation of the object. Although rotatable objects find use in many different applications, one particular application is a rotating drum of a washing machine.

U.S. Pat. No. 5,561,993, which issued to Elgersma et al. on Oct. 22, 1996, and is incorporated herein by reference, discloses a self-balancing rotatable apparatus. Elgersma et al. disclosed a method and system for measuring forces and motion via accelerations at various locations in a system. The forces and moments were balanced through the use of a matrix manipulation technique for determining appropriate counterbalance forces located at two axial positions of the rotatable member. The method and system described in Elgersma et al. accounted for possible accelerations of a machine, such as a washing machine, which could not otherwise be accomplished if the motion of the machine were not measured. Such a method and system was operable in association with machines that are not rigidly attached to immovable objects, such as concrete floors. The algorithm disclosed by Elgersma et al. permitted counterbalance forces to be calculated even though a washing machine is located on a moveable floor structure combined with carpet padding and carpets between the washing machine and a rigid support structure.

U.S. Pat. No. 5,561,993 thus described a dynamic balance control algorithm for balancing a centrifuge for fluid extraction. To accomplish such balance control, sensor measurements may be used to assess the immediate balance conditions and determine the course of balance control. Related sensor responses to balance control actions may be modeled to determine the specific future control actions. In assessing the balance condition, measurement thresholds can be established (e.g., balance-threshold, maximum-threshold). In the case where acceleration measurements are utilized directly, thresholds change with rotational speed and the relation to the perceived balance is not intuitive. Thus, it is difficult to establish consistent criteria across multiple sensors, sensing axes, and full operating ranges. This often results in transitions to stricter threshold criteria at higher rotational speeds, which cannot be met. Also, when utilizing force and acceleration measurements, it is often difficult to determine their relative importance in describing the balance condition. This often results in inadequate balancing at some speeds while over balancing at others.

The present inventor has thus concluded, based on the foregoing, that a need exists for a method and system for measuring the dynamics of a rotating system and relating those sensor measurements to the balance condition in a manner that provides consistent criteria across multiple sensors, sensing axes, and rotational speeds, and which additionally is based on simple computational algorithms. The present inventor believes that the invention described herein can overcome these obstacles through the utilization of a signal-energy-based measuring scheme, which can directly relate thresholds to perceived balance conditions and provide consistency in multiple sensor measurement configurations.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

In accordance with addressing the shortcomings of the prior art, it is one aspect of the present invention to provide methods and systems in which rotatable members can achieve balanced conditions throughout a range of rotational speeds.

It is another aspect of the present invention to provide methods and systems for dynamically balancing rotatable members through the continual determination of out-of-balance forces and motion to thereby take corresponding counter balancing action.

It is yet another aspect of the present invention to provide methods and systems for measuring the dynamics of rotating systems and devices thereof in order to make corrections necessary to placing such systems or devices in a balanced condition.

It is still another aspect of the present invention to provide methods and systems for dynamic balancing of rotating system using energy-based threshold measurements to determine the course of balance control.

In accordance with various aspects of the present invention, methods and systems are disclosed herein for dynamically balancing a rotating system utilizing energy-based threshold measurements, wherein the rotating system contains sensors therein. Sensor measurements are compiled from the sensors. The sensor measurements contain data indicative of the dynamics of the rotating system. The sensor measurements are converted to signal-energy values, or values proportional to signal-energy, associated with the rotating system. The signal-energy values can then be compared to predefined signal-energy threshold values to thereby determine the proper course for balancing corrections necessary to dynamically place the rotating system in a balanced state or change rotational speed.

Additionally, a predefined signal-energy threshold profile may be converted into a sensor measurement threshold profile for direct comparison to the sensor measurements. When force and acceleration measurements are used to assess the balance condition, wherein the measurement represents the simple sinusoidal component of the sensed signal at the speed of rotation, managing the signal-energy relates proportionally to maintaining physical displacement. The signal-energy threshold profile becomes a displacement threshold profile, with an intuitive association to the balance condition, which may be converted to force and acceleration sensor measurement threshold values associated with a range of rotational speeds. Thereafter, the sensor measurements may be compared to the force and acceleration threshold values, thereby determining proper course for balancing corrections necessary to dynamically place the rotating system in a balanced state or change its rotational speed.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate embodiments of the present invention and are not intended to limit the scope of the invention.

The present invention is generally an improvement to the invention disclosed in U.S. Pat. No. 5,561,993. The basic configuration and concepts explained in U.S. Pat. No. 5,561,993 are disclosed herein but in no manner limit the scope of the invention described and claimed herein. Features revealed in U.S. Pat. No. 5,561,993 are presented herein for illustrative purposes only in order to explain the foundation from which the present invention has been derived. Those skilled in the art can appreciate that such features, including figures, text, descriptions, equations and tables thereof do not limit the scope of the present invention.

Figure 1:
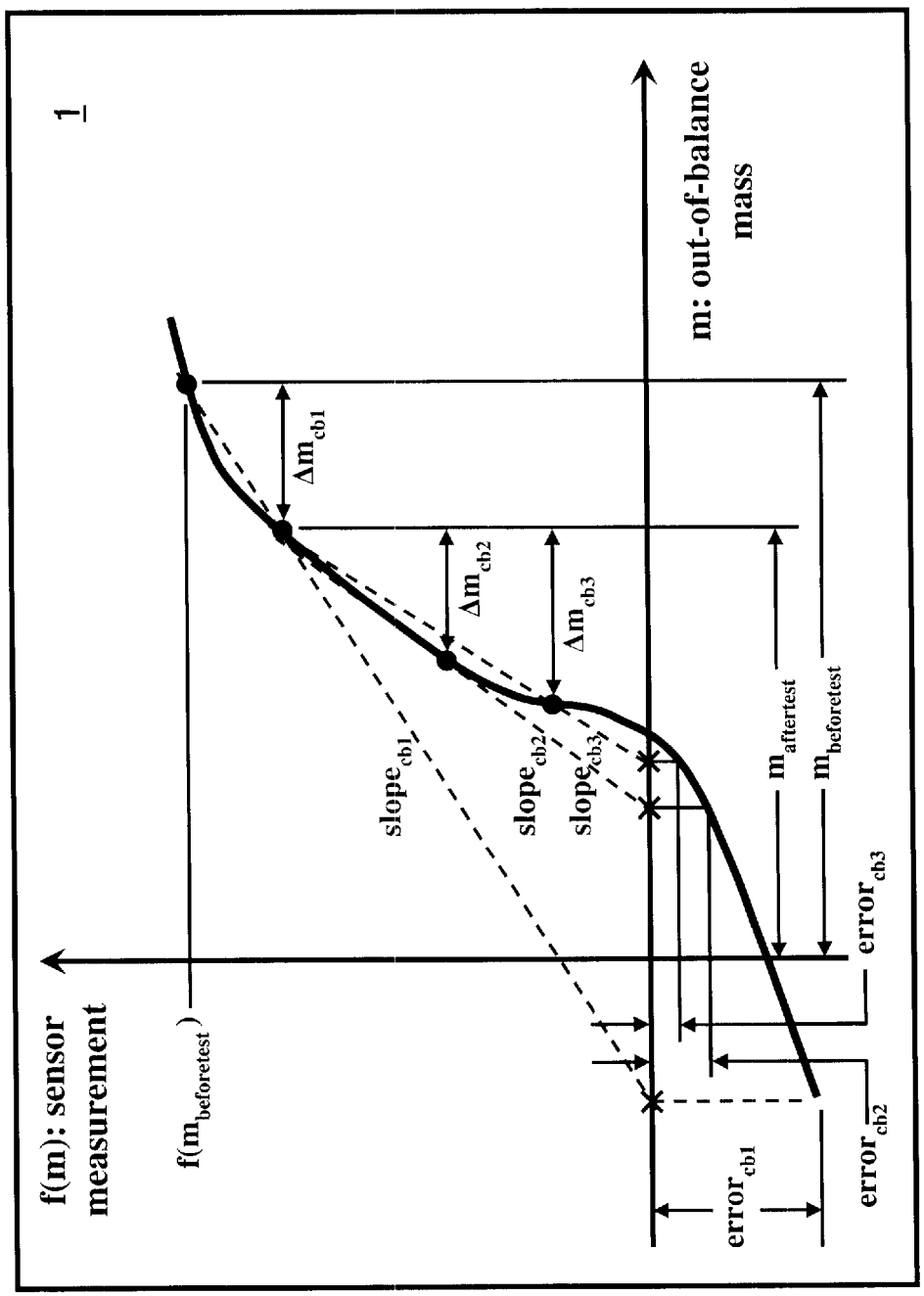
FIG. 1 depicts a plot of a non-linear system, in accordance with preferred embodiments of the present invention.

FIG. 1 depicts a plot of a non-linear system 1, in accordance with preferred embodiments of the present invention. Given a very simple (e.g., one-dimensional) non-linear system, such as non-linear system 1, the system can be balanced when the sensor measurement, f(m), is driven to zero. The objective of such a system is to find a value for a counterbalance $\Delta m$, such that the sensor measurement f(m) is driven to zero, i.e., f(m)=0. Utilizing a Taylor's series expansion in the vicinity of the anticipated operating range and neglecting second order and higher terms, results in a linear model: straight line of the form y=b+mx. The system can be perturbed, $\Delta m_{cb}$, to determine the slope of the linear model, and the counterbalance $\Delta m$ for driving f(m) to zero can be estimated. The linear model can be written to reflect the example illustrated in FIG. 1, where several possible line estimates are shown; equation 1 expresses this relationship.

$$f(m_{next}) \approx f(m_{aftertest}) + \left(\frac{\partial f(m)}{\partial m}\right) \cdot (m_{next} - m_{aftertest}) \tag{1}$$

Those skilled in the art can appreciate that f($m_{next}$) represents the desired sensor measurement. In addition, f($m_{aftertest}$) can represent the sensor measurement after placement of a test mass or a prior balance-control action. The variable m generally represents the out of balance in the system. For example, the variable $m_{aftertest}$ generally represents the out-of-balance mass after placement of a test weight ($\Delta m_{test}$), and the change in m, (i.e., $\Delta m = m_{next} - m_{aftertest}$), is the counterbalance mass required to achieve a desired sensor measurement, (f($m_{next}$)=0). The control action involves moving in the direction of the estimated counterbalance and updating the system model and the required counterbalance estimate as control progresses. Those skilled in the art can appreciate that this control implementation of equation 1 represents the well-known Newton Raphson iteration method.

Since the objective is to find f($m_{next}$)=0, the general form of the equation reduces to:

$$m_{next} = m_{aftertest} - \left[\frac{\partial f(m)}{\partial m}\right]^{-1} \cdot f(m_{aftertest}) \tag{2}$$

where $m_{next}$ is the solution or system out of balance needed to make f($m_{next}$)=0, or drive the sensor measurement to zero. Thus, the estimated mass change $m_{cb}$ generally required for counterbalance action is illustrated in equation 3.

$$m_{cb} = m_{next} - m_{aftertest} = -f(m_{aftertest}) \bigg/ \left(\frac{\partial f}{\partial m}(m_{aftertest})\right) \tag{3}$$

The partial derivative, or slope of the sensor function, can be found by perturbing the system. This may be generally illustrated in equation 4, which represents the change in sensor measurements due to placement of the test weight ($\Delta m_{test} = m_{aftertest} - m_{beforetest}$).

$$\frac{\partial f}{\partial m}(m_{aftertest}) = \frac{f(m_{aftertest}) - f(m_{beforetest})}{m_{aftertest} - m_{beforetest}} \tag{4}$$

Combining equations 3 and 4 can result in a generalized form shown in equation 5 below, which is generally expressed in an expanded notion of multiple inputs and outputs.

$$[f(m_{aftertest})] = -\left[\frac{\partial f(m)}{\partial m}\right] \cdot [\Delta m_{solution}] \tag{5}$$

Regarding the linear models and associated slope calculation in FIG. 1, it can be appreciated that a change in the mass may result in a change in the system, and the system itself may be nonlinear; thus, the linear model used to determine the next counterbalance may have significant error. Therefore, when applying the Newton Raphson iteration to a process, certain requirements should be followed. First, the initial approximation should be sufficiently accurate to result in subsequent operation near the desired solution and the measurement f(m) being smooth, nearly linear and single-valued in the vicinity of the anticipated operation. Additionally, because higher derivatives of force are neglected in this type of approximation, the higher derivatives should be small so as to avoid convergence problems.

Lastly, in applications of the Newton Raphson iteration, only one solution of mass m should exist for the sensor measurement being equal to zero. This means there is only one root. Even after following the above requirements, system noise may be a concern. In the hypothetical illustration of FIG. 2, a larger initial test weight, which changes the system to point C, is preferable to the one that changes it to point B. This can be evidenced by comparing the slopes of lines 22, 24 and 26. These slopes result from the various test mass perturbations depicted in FIG. 2. The difference between the before and after test measurement should be large enough to obtain a good approximation of the slope of the function and ensure the resulting change in the measurement dominates the changes due to system noise.

Figure 3:
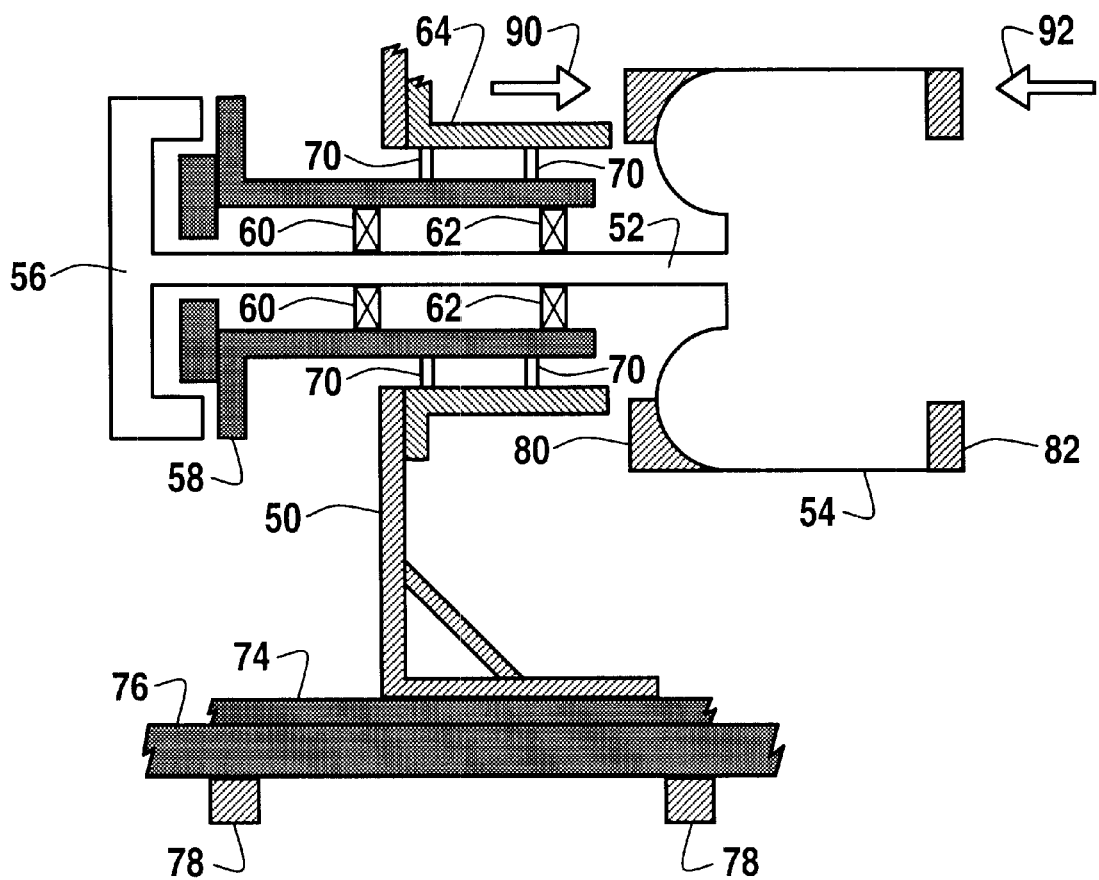
FIG. 3 depicts a schematic representation of a washing machine, which may be adapted for use in association with the present invention.

FIG. 3 depicts a schematic representation of a washing machine used to illustrate the concepts in U.S. Pat. No. 5,561,993, which may be adapted for use in association with the present invention. Those skilled in the art can appreciate that the present invention may be implemented within a rotating device or rotating system, such as, for example, a washing machine. Those skilled in the art can further appreciate, however, that other types of rotatable systems or rotating devices may be utilized in accordance with the present invention. Note that as utilized herein, the terms "rotating system," "rotating device," "rotating apparatus," "rotatable apparatus," "rotatable system," or "rotatable device" may be utilized interchangeably. Note that an example of a type of a rotating system or rotating device that may be implemented in accordance with the methods and system of the present invention is a washing appliance. Examples of applicable washing appliances include washing devices, such as washing machines, dishwashers, circuit board cleaners and so forth. Such devices are not, of course, limiting features of the present invention but instead are mentioned herein for edification purposes.

The basic mechanism of dynamic balancing involves counter balancing the out-of-balance load by injecting water into a plurality of cups placed at front and back axial planes, identified by reference numbers 80 and 82 in FIG. 3, of the rotatable drum. Although the test mass or "mass" used to describe a preferred embodiment of the present invention may be a fluid mass, those skilled in the art can appreciate that such a mass may be comprised of many different materials, and the invention is not limited to fluid-based injection for placing mass.

FIG. 3 thus schematically illustrates a washing machine comprising a frame 50, a shaft 52 and a rotatable drum 54. Shaft 52 may be attached to rotatable drum 54. These two components can be attached to a rotor or pulley 56 of a motor drive. Frame 50 can provide support for a bearing housing 58 in which bearings, 60 and 62, are generally supported. A housing mount 64 can support bearing housing 58. A plurality of sensors identified by the reference numeral 70 is illustrated at location between the housing mount and the bearing housing in FIG. 3. These sensors will be described in greater detail below. Beneath frame 50 are generally shown a carpet and pad 74, a plywood support member 76 and a plurality of joists 78. The representation shown in FIG. 3 illustrates a typical application of a horizontal washing machine in a residential housing application. Those skilled in the art can appreciate that FIG. 3 is presented for illustrative purposes only and that a variety of washing machine configurations and other rotating devices not illustrated herein may be utilized to implement varying embodiments of the present invention.

With continued reference to FIG. 3, the rotatable drum 54 may be shown having a plurality of schematically illustrated back cups 80 and front cups 82. Both the front and back cups may be disposed at axial ends of the rotatable drum 54 and, although not shown in FIG. 3, both the front and back cups can comprise a plurality of cups dispersed around the periphery of the drum. A quantity of water can be injected into the cups from a stationary control valve supplied with water, such as those identified by reference numerals 90 and 92.

Figure 4:
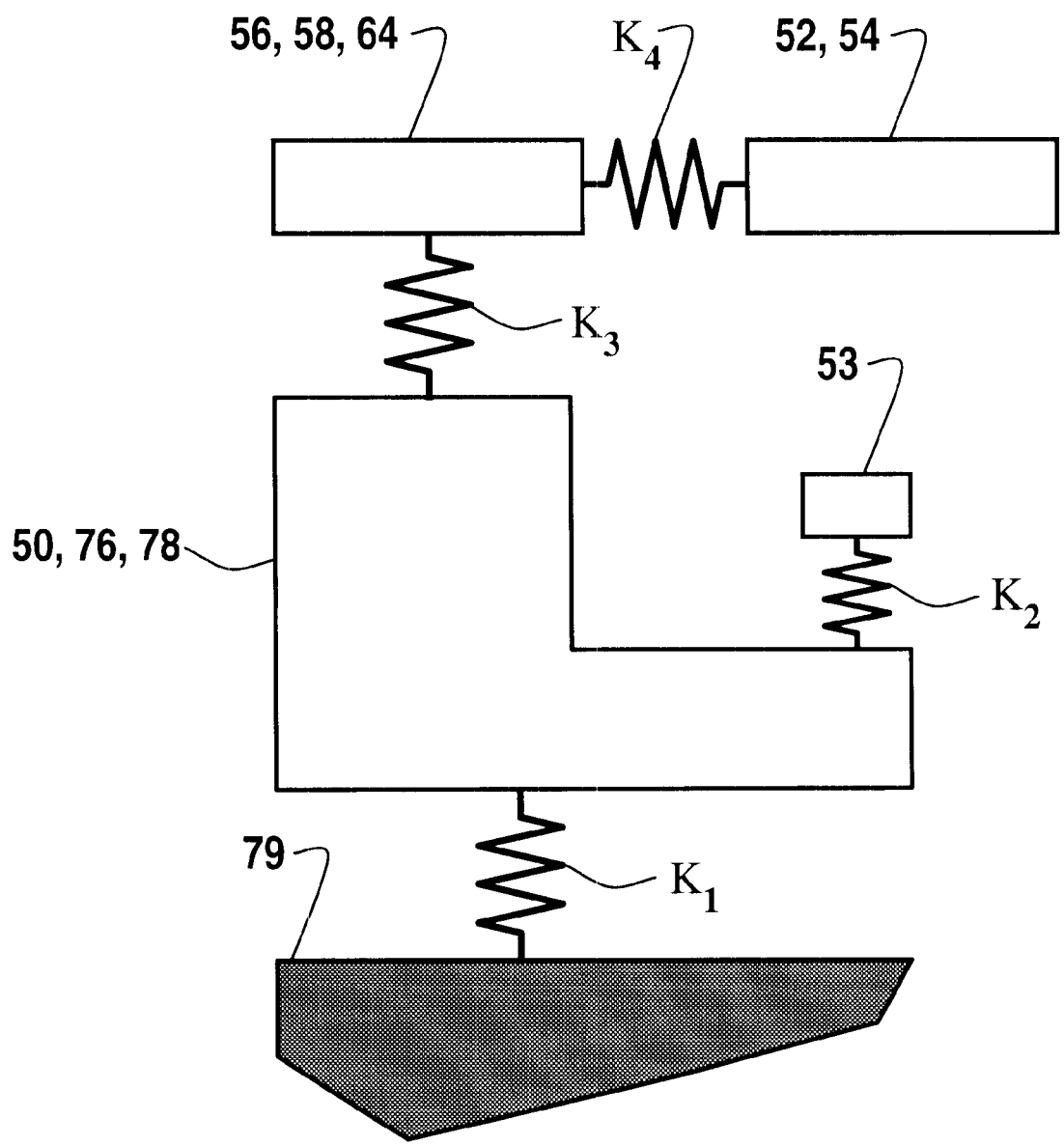
FIG. 4 depicts a spring and mass illustration depicting the manner in which a nonrigid washing machine can behave if mounted on nonrigid structures.

FIG. 4 illustrates a simplified schematic mass and spring representation of a washing machine such as that shown in FIG. 3. Some balancing systems assume the machine may be attached rigidly to an immovable object or footing, such as a concrete floor. In most practical residential housing applications, however, the machine is not rigidly attached to an immovable object and, instead, may be associated with a plurality of flexible members. For example, FIG. 4 depicts a schematic representation of a type of arrangement usually encountered in washing machine applications. FIG. 4 thus illustrates a spring and mass illustration depicting the manner in which a nonrigid washing machine can behave if mounted on nonrigid structures.

The behavior of frame 50 in relation to footing 79 can be described as a spring representing frame 50 and floor 76 and having a spring constant K1. The relationship between a tub 53 (not shown in FIG. 3) surrounding the rotatable drum 54 and frame 50 can be described by a spring constant K2. A spring constant K3 represents the relationship between bearing housing 58 and housing mount 64, and frame 50 in FIG. 3. Lastly, FIG. 4 illustrates a spring constant K4 that represents the bending of shaft 52 along with rotatable members 54 and 56.

Although only represented by boxes in FIG. 4, the schematic illustration depicts a multitude of mass-spring subsystems defining the relationships between major components of the overall system. One purpose for the FIG. 4 illustration is to demonstrate that the relationships between these components are not rigid and, as a result, can permit motion, resulting in accelerations, to occur in response to forces exerted on the various components. Therefore, if the system is not rigid and only forces are measured by the sensors 70 shown in FIG. 3, accurate counterbalance determinations would be extremely difficult, if not impossible, to make.

Figure 2:
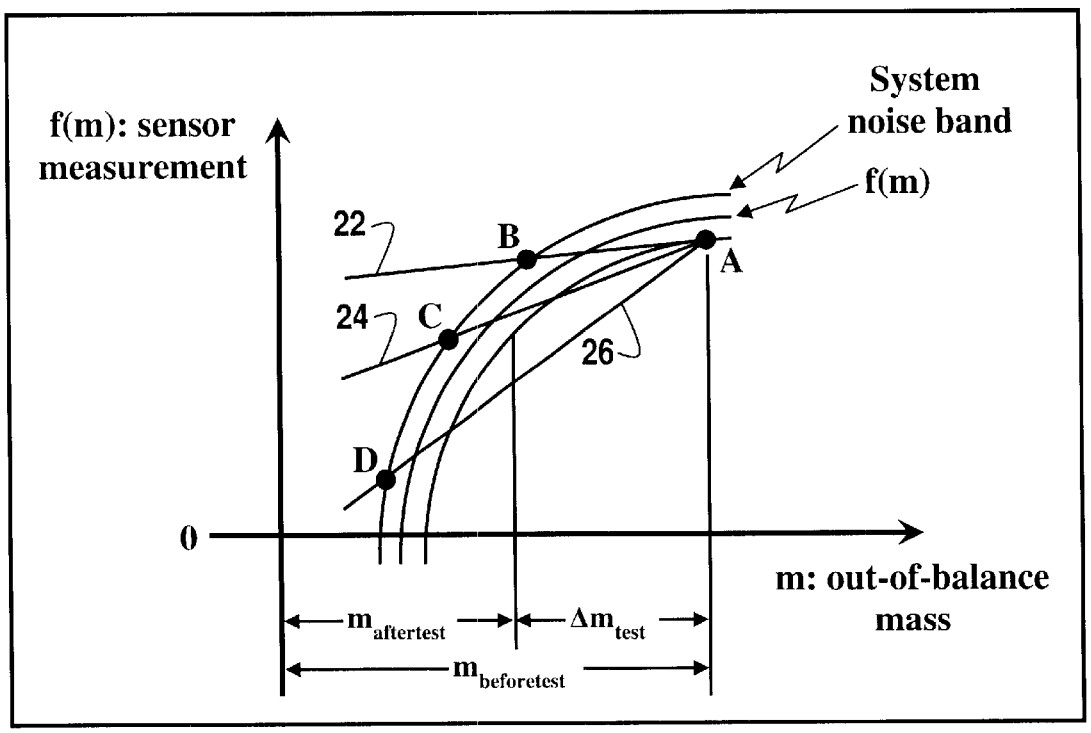
FIG. 2 illustrates a graphical representation of a nonlinear system and the effect of system noise with which the present invention must be concerned.
Figure 5:
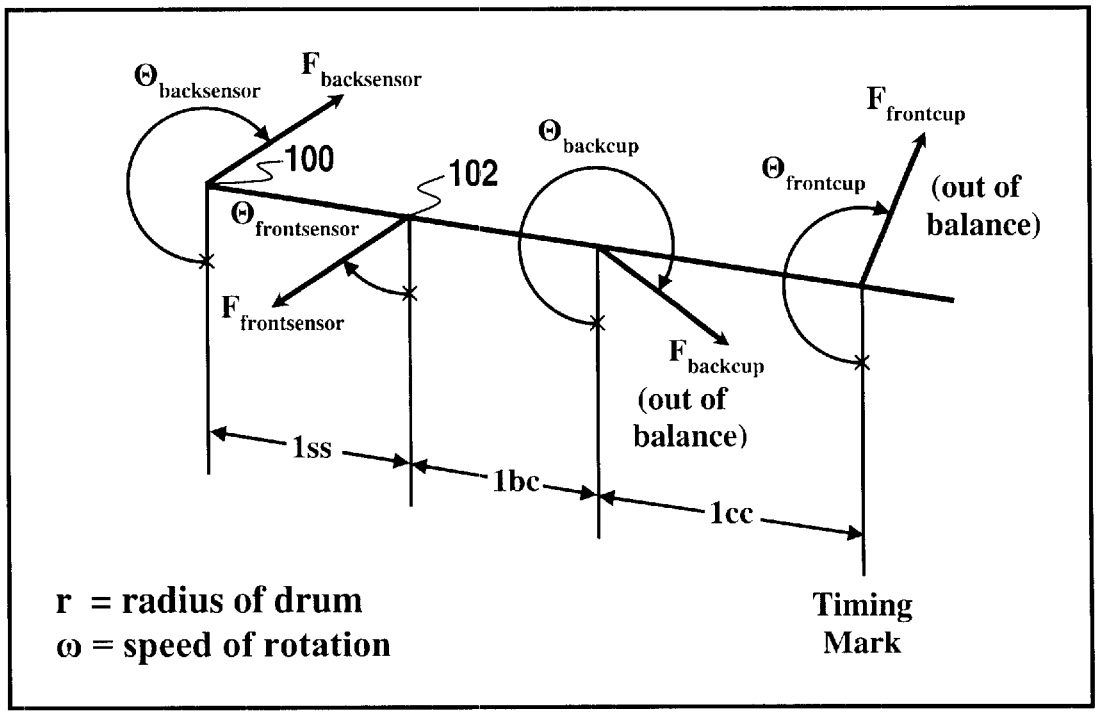
FIG. 5 depicts a three dimensional schematic representation of the forces and critical lengths along an axis of rotation, which has been extended along a length of the shaft and through a length of the drum.

FIG. 5 illustrates a three-dimensional schematic representation of the forces and critical lengths along the axis of rotation, which has been extended along the length of the shaft and through the length of the drum. Force sensors may be mounted to measure the force transmitted between housing mount 64 and bearing housing 58, as illustrated in FIG. 2. The basic concept of dynamic balancing stipulates that vector forces at the front and back cups may represent an out-of-balance condition. Referring to FIG. 5, the system may be provided with a mechanism for sensing a first force $F_{backsensor}$ at a first location 100 of the axis of rotation and a second mechanism for measuring a second force $F_{frontsensor}$ at a second location 102 of the axis of rotation. It should be understood that both the first and second forces shown in FIG. 5 are likely to be determined from a plurality of force sensors arranged so that the resultant force vectors along multiple axes of the system can be determined at each of the first and second locations, 100 and 102, of the axis of rotation.

If a washing machine or similar apparatus with a rotating member is rigidly attached to an unmovable object, such as a concrete floor, in such a manner that movement of the machine was prevented, a mere force and moment analysis based on forces and moment arms shown in FIG. 5 would be appropriate and could yield sufficient information to allow the counterbalance forces to be implemented in a manner that would achieve a balance of a rotating drum 54. As discussed above, however, in association with FIGS. 3 and 4, it is not practical to expect a machine of this type to be installed and operate without motion being experienced by the various portions of the machine. Therefore, it may be beneficial to measure motion relative to a footing or inertial space (e.g., acceleration) and account for it in the analysis of forces.

Figure 6:
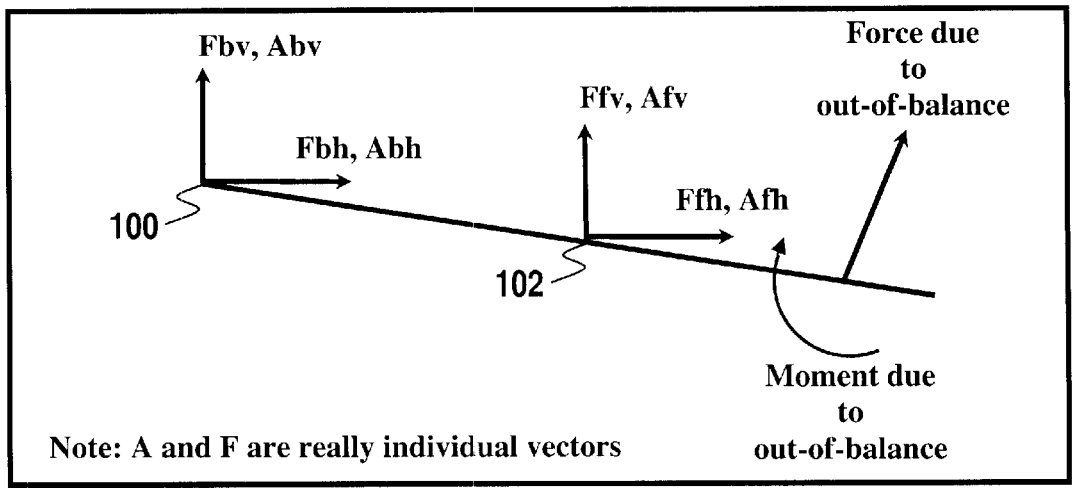
FIGS. 6 and 7 depict a graphical representation of a shaft with measured forces and accelerations.
Figure 7:
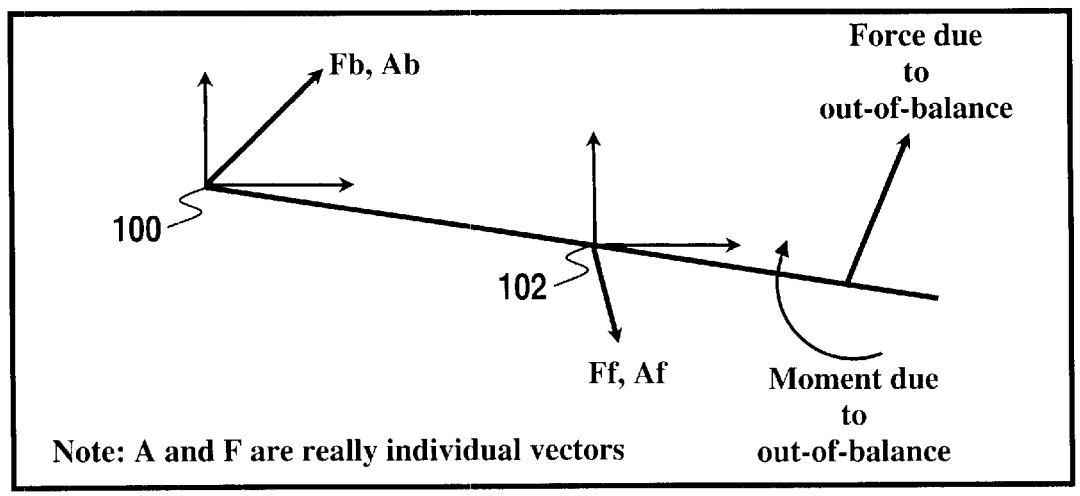

FIGS. 6 and 7 show the measurement of forces and accelerations in three-dimensional space at various locations along the shaft 52. Viewing FIGS. 6 and 7 together, it can be seen that the forces and accelerations can be measured at two coincident locations on the shaft 52. It can be appreciated, however, that this coincidence of the first force and the first acceleration or the second force and the second acceleration are not requirements of the present invention. At each of the first and second locations, 100 and 102, the effects of rotating out-of-balance forces are determined along the horizontal (h) and vertical (v) coordinates. It can be appreciated by those skilled in the art that the coordinates illustrated in FIGS. 6 and 7 represent the fact that the concepts in U.S. Pat. No. 5,561,993 and the present invention operate with information describing the forces in terms of a magnitude, a fixed direction and an associated rotating drum angle. Similarly, the motion (e.g., accelerations) may also be expressed as a magnitude along a fixed direction with an associated rotating drum angle.

TABLE I

| VARIABLE | MEANING |
|---|---|
| Inputs | |
| $\Delta m_{front\_cb}$ | test counterbalance mass placed in the front plane (vector) |
| $\Delta m_{back\_cb}$ | test counterbalance mass placed in the back plane (vector) |
| $\omega_{back}$ | speed of rotation in (rad/sec) at which the back plane test counterbalance occurred |
| $\omega_{front}$ | speed of rotation in (rad/sec) at which the front plane test counterbalance occurred |
| R | radius of counterbalance placement (inches) current speed of rotation |
| Outputs | |
| $f_{back}$ | back force sensor (lbf) (vector) |
| $f_{front}$ | front force sensor (lbf) (vector) |
| $a_{back}$ | back accelerometer sensor (in/sec$^2$) (vector) |
| $a_{front}$ | front accelerometer sensor (in/sec$^2$) (vector) |
| Actions | |
| $m_{backplane\_cb}$ | estimated backplane counterbalance to drive sensor readings to zero (vector) |
| $m_{frontplane\_cb}$ | estimated frontplane counterbalance to drive sensor readings to zero (vector) |

For the following discussion, Table I illustrates the inputs and outputs used in the multi-input/multi-output condition relating to the invention discussed in U.S. Pat. No. 5,561,993. In order to find the appropriate solutions for the counterbalance forces described above in conjunction with FIG. 4, the measured forces and accelerations should be considered in the balancing of the system forces and moments. As described above, the counterbalance masses, forces and accelerations represent magnitudes and angles. Therefore, all variables shown in Table I, except r and ω, generally comprise both a magnitude and an angle in polar coordinates, which can be converted to complex coordinates. The relationship described in equation 5 above can be rewritten for the multi-input/multi-output case to result in four coupled simultaneous equations, incorporating the effects of perturbations in both front and back planes that could have occurred at rotational speeds slightly different from the current speed. These four relationships are shown below and are identified as equation 6 below.

$$a_{back4} = -\left(\frac{a_{back1} - a_{back0}}{r \cdot \omega_{back}^2 \cdot \Delta m_{back\_cb}}\right) \cdot r \cdot \omega^2 \cdot m_{backplane\_cb} - \left(\frac{a_{back3} - a_{back2}}{r \cdot \omega_{front}^2 \cdot \Delta m_{front\_cb}}\right) \cdot r \cdot \omega^2 \cdot m_{frontplane\_cb}$$

$$a_{front4} = -\left(\frac{a_{front1} - a_{front0}}{r \cdot \omega_{back}^2 \cdot \Delta m_{back\_cb}}\right) \cdot r \cdot \omega^2 \cdot m_{backplane\_cb} - \left(\frac{a_{back3} - a_{back2}}{r \cdot \omega_{front}^2 \cdot \Delta m_{front\_cb}}\right) \cdot r \cdot \omega^2 \cdot m_{frontplane\_cb}$$

$$f_{back4} = -\left(\frac{f_{back1} - f_{back0}}{r \cdot \omega_{back}^2 \cdot \Delta m_{back\_cb}}\right) \cdot r \cdot \omega^2 \cdot m_{backplane\_cb} - \left(\frac{f_{back3} - f_{back2}}{r \cdot \omega_{front}^2 \cdot \Delta m_{front\_cb}}\right) \cdot r \cdot \omega^2 \cdot m_{frontplane\_cb}$$

$$f_{back4} = -\left(\frac{f_{front1} - f_{front0}}{r \cdot \omega_{back}^2 \cdot \Delta m_{back\_cb}}\right) \cdot r \cdot \omega^2 \cdot m_{backplane\_cb} - \left(\frac{f_{front3} - f_{front2}}{r \cdot \omega_{front}^2 \cdot \Delta m_{front\_cb}}\right) \cdot r \cdot \omega^2 \cdot m_{frontplane\_cb}$$

(6)

The four relationships are generally grouped together as a single equation since they can be treated as a matrix in the following discussion. The meanings of the subscripts in equation 6 above are identified in Table II.

TABLE II

| SUBSCRIPT | MEANING |
|---|---|
| 0 | Measurement prior to backplane counter-balance test mass $\Delta m_{back\_cb}$ |
| 1 | Measurement after backplane counter_balance test mass $\Delta m_{back\_cb}$ |
| 2 | Measurement prior to frontplane counterbalance test mass $\Delta m_{front\_cb}$ |
| 3 | Measurement after frontplane counterbalance test mass $\Delta m_{front\_cb}$ |
| 4 | Current sensor measurement |

The relationships shown above in equation 6 can be applied to equation 5 in matrix form as:

$$\begin{bmatrix} a_{back4} \\ a_{front4} \\ f_{back4} \\ f_{front4} \end{bmatrix} = -\begin{bmatrix} \frac{a_{back1} - a_{back0}}{r \cdot \omega_{back}^2 \Delta m_{back\_cb}} & \frac{a_{back3} - a_{back2}}{r \cdot \omega_{front}^2 \Delta m_{front\_cb}} \\ \frac{a_{front1} - a_{front0}}{r \cdot \omega_{back}^2 \Delta m_{back\_cb}} & \frac{a_{front3} - a_{front2}}{r \cdot \omega_{front}^2 \Delta m_{front\_cb}} \\ \frac{f_{back1} - f_{back0}}{r \cdot \omega_{back}^2 \Delta m_{back\_cb}} & \frac{f_{back3} - f_{back2}}{r \cdot \omega_{front}^2 \Delta m_{front\_cb}} \\ \frac{f_{front1} - f_{front0}}{r \cdot \omega_{back}^2 \Delta m_{back\_cb}} & \frac{f_{front3} - f_{front2}}{r \cdot \omega_{front}^2 \Delta m_{front\_cb}} \end{bmatrix} \cdot \begin{bmatrix} m_{backplane\_cb} \\ m_{frontplane\_cb} \end{bmatrix} \cdot r \cdot \omega^2 \quad (7)$$

Where we describe this matrix equation as being in the form b=Ax and $$A = -\frac{\partial f(m)}{\partial m} = -\begin{bmatrix} \frac{a_{back1} - a_{back0}}{r \cdot \omega_{back}^2 \cdot \Delta m_{back\_cb}} & \frac{a_{back3} - a_{back2}}{r \cdot \omega_{front}^2 \cdot \Delta m_{front\_cb}} \\ \frac{a_{front1} - a_{front0}}{r \cdot \omega_{back}^2 \cdot \Delta m_{back\_cb}} & \frac{a_{front3} - a_{front2}}{r \cdot \omega_{front}^2 \cdot \Delta m_{front\_cb}} \\ \frac{f_{back1} - f_{back0}}{r \cdot \omega_{back}^2 \cdot \Delta m_{back\_cb}} & \frac{f_{back3} - f_{back2}}{r \cdot \omega_{front}^2 \cdot \Delta m_{front\_cb}} \\ \frac{f_{front1} - f_{front0}}{r \cdot \omega_{back}^2 \cdot \Delta m_{back\_cb}} & \frac{f_{front3} - f_{front2}}{r \cdot \omega_{front}^2 \cdot \Delta m_{front\_cb}} \end{bmatrix} \quad (8)$$

Equations 6, 7 and 8 depict the mathematical model that was developed and described in U.S. Pat. No. 5,561,993. This mathematical model is formulated such that the dynamics of the system are divided into two columns based on whether mass is placed in the front plane (i.e., column 2) or the back plane (i.e., column 1) of the spinner. The present invention disclosed herein may be used with this control model or like extensions, the more general solution of which allows for the placement of mass in both the front and the back plane simultaneously and covers the case where more than two inputs to the system may be utilized.

The equation relationships shown in equation 7 can be rewritten in matrix format to solve for the counterbalance masses, $m_{backplane\_cb}$ and $m_{frontplane\_cb}$, required to bring the system into balance in the same manner as described in U.S. Pat. No. 5,561,993. For the case of four sensors and using the A matrix of equation 8, this can be expressed through equation 9 as:

$$r \cdot \omega \cdot \begin{bmatrix} m_{\text{backplane\_cb}} \\ m_{\text{frontplane\_cb}} \end{bmatrix} = -A^+ \cdot \begin{bmatrix} a_{back} \\ a_{front} \\ f_{back} \\ f_{front} \end{bmatrix} \quad (9)$$

In a situation such as that described by equation 9 above, two accelerations and two forces are known from measurements and two counterbalanced forces are unknown, there are more equations than unknowns. Each sensor provides an equation, while there are only two unknown counterbalance forces for the front and back planes of the drum. Therefore, the system is over determined and a technique is required to solve for more equations than unknowns in an optimal manner. The technique for solving equations of this type in a balancing scheme should find a solution that minimizes all of the sensor readings and also minimizes the amount of counterbalance action required to balance the rotating system or rotating device. In other words, the force sensors and the accelerometers should all be driven as close to zero as possible by the selected counterbalances and the total amount of counterbalance actions taken should be minimized.

Those skilled in the art can appreciate that a mathematical technique, which may solve this problem, involves computation of the pseudo inverse of the A matrix ($A^+$) utilizing the singular value decomposition (SVD) technique. This solution method finds the optimal solution to the inconsistent system represented simply by equation 9. The SVD is one of several techniques that can support the pseudo-inverse calculation for control. It can provide optimal control for both inputs and outputs of the modeled system. Other variations of the components that make up the SVD may be used alone but would not provide both input and output optimization. This procedure is fully described in U.S. Pat. No. 5,561,993, is well known to those skilled in the art and is described in significant detail in various reference linear algebra textbooks.

After generating the solution to equation 9, it may be necessary to formulate a practical approach to applying the counterbalance mass to the rotating member. Further, after the control action is applied it may be necessary to evaluate the member to verify that the control action had the desired balancing affect. In an ideal system the force applied to the rotating potion of the member is linearly related to the force and motion that the sensors measure. In this ideal system the placement of the optimal counterbalances determined by solving the system in the manner described herein should drive all of the sensors to zero and achieve perfect balance of the rotating member.

For various reasons, however, it is not expected that an ideal system exists. An approach to applying counterbalance and verifying the control action effect is fully described in U.S. Pat. No. 5,561,993, which is incorporated herein by reference. Those skilled in the art can appreciate that the approaches to applying counterbalance and verifying the control action affect, which were disclosed in U.S. Pat. No. 5,561,993, do not limit the scope of the present invention. The features, techniques, methods and systems disclosed in U.S. Pat. No. 5,561,993 are described herein for illustrative and background purposes only.

Figure 8:
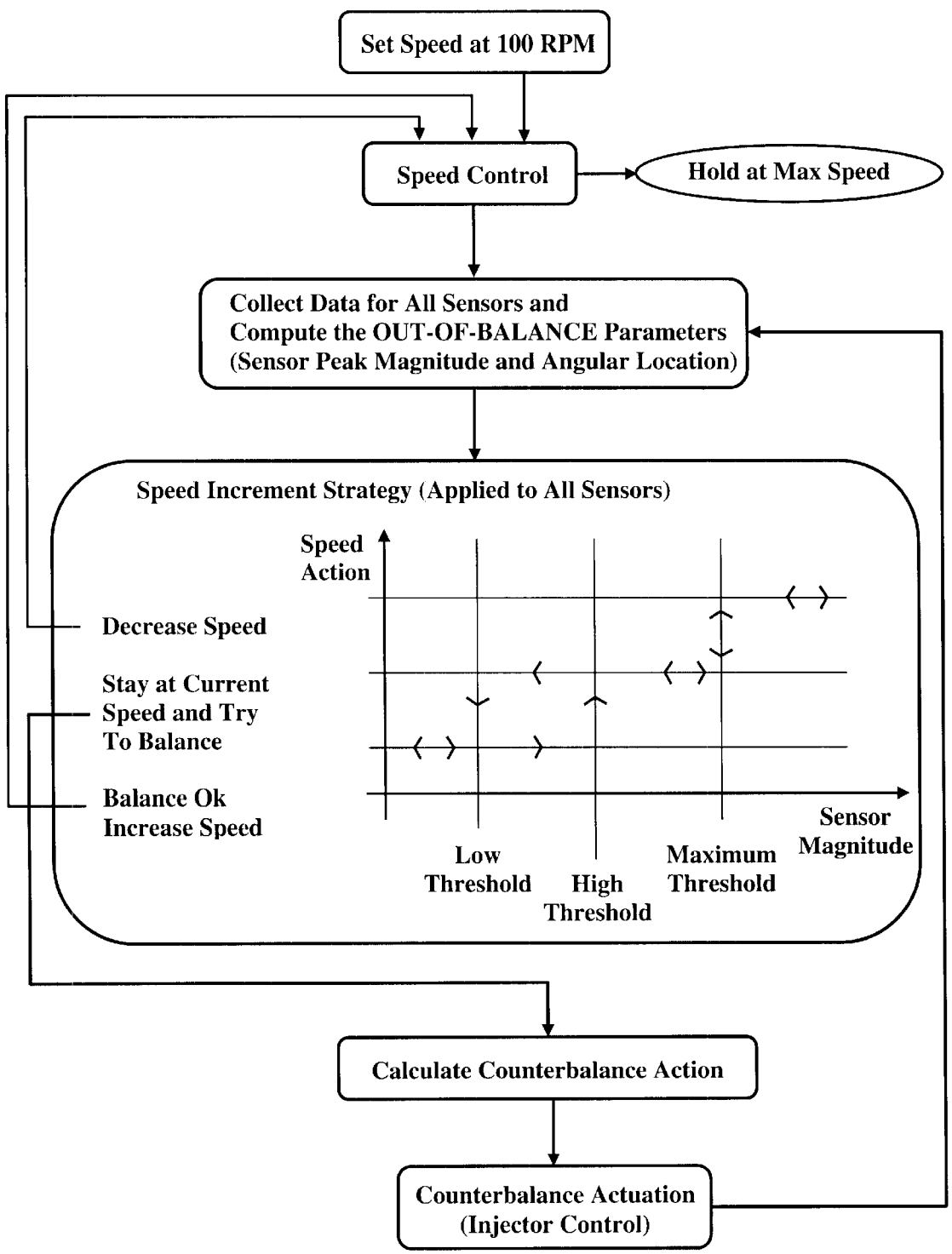
FIG. 8 illustrates a flow chart of operations illustrating operational steps that may be followed for the serial implementation of a balance control algorithm in which sensor measurement thresholds are used to evaluate the balance state.

In a preferred embodiment of the present invention, the system balance, operational safety, and physical constraints can be evaluated based on the concept of sensor measurement threshold. As illustrated in FIG. 8, the top-level control sequence may be directed by the system balance and operational safety evaluations. FIG. 8 depicts a flow chart of operational steps that may be followed for the serial implementation of a balance control algorithm in which sensor measurement thresholds are used to evaluate the balance state.

At the extremes are the balance threshold and the maximum threshold. The balance threshold defines the sensor level below which the rotating member is defined as being in a balanced state. The maximum threshold defines the sensor level above, which the rotating member should not be for any extended length of time. Intermediate thresholds establish levels at which balance control versus speed control decisions get made. Additionally, the control actuator applies a physical limit on the amount of input that can be applied to the system at any one time, as does the physical design of the member in terms of accommodating the counterbalance mass. These physical limits are evaluated in terms of their ability to affect sensor responses less than the balance threshold with sufficient room to operate within the balance to maximum threshold range.

The thresholds referred to herein can be arrived at utilizing a variety of techniques, such as, for example, empirical data or computational methods. Likewise, they can be represented in a variety of fashions, such as, for example, direct sensor measurements or computationally manipulated sensor measurements. In the case where acceleration measurements are utilized directly, thresholds change with rotational speed and the relation to the perceived balance is not intuitive. Thus, it is difficult to establish consistent criteria across multiple sensors, sensing axes, and full operating ranges.

This often results in jumps to stricter threshold criteria at higher rotational speeds that cannot be met. Also, when utilizing force and acceleration measurements, it is often difficult to determine their relative importance in describing the balance state. This often results in inadequate balancing at some speeds while over balancing at others. The present invention is thus generally an improvement to the invention described by U.S. Pat. No. 5,561,993 in that by representing the thresholds in terms of the measured sensor's signal energy, a direct relation to system parameters intuitively associated with perceived balance state is established. As a result, sensor measurements may be related, via simple computational methods, to the balance condition in a manner that provides consistent criteria across multiple sensors, sensing axes, and rotational speeds. The development of energy-based thresholds is described in more detail in the following.

Relevant to the sensing aspect of the present invention is the fact that the forces and accelerations of interest are actually rotating vectors. That is, they are fixed with respect to the rotating members of the system and rotate at the rotational speed with respect to the stationary members of the system. Thus, the desired information has a constant magnitude and angle regarding the rotating reference frame of the rotational members that is then superimposed by a periodic component regarding the stationary reference frame that supports the rotating members. In the preferred embodiment described above, sensors for obtaining this information can be attached to the stationary members, as illustrated in FIGS. 3 and 5. It is important to understand that the present invention is not limited to this particular sensor attachment. Depending on the dynamics of the system, not only could sensors be located on other parts of the stationary members but may also be mounted on parts of the rotating members of the system.

The signals from the sensor measurements may be comprised of a sinusoidal waveform with a constant offset bias and corrupted by measurement noise as well as harmonically related system noise. The signal component of interest is the sinusoidal component at the frequency matching the speed of rotation. Known data acquisition techniques can be used to acquire the data in a digital format, including AC coupling to eliminate the constant offset bias, amplification as needed, and low pass filtering to prevent aliasing in the event the data is digitized. Additional corruption of the sensor signals can be eliminated with a narrow band pass function that is tunable in real time to the speed of rotation. The band pass function also rejects external disturbances that can occur at frequencies other than the rotating frequency. Signal conditioning should introduce insignificant or known fixed delays to the sensed data. Certain aspects of the signal conditioning can be performed with analog or digital techniques.

The resultant sinusoidal signal contains the magnitude and angle information of interest and can be represented as pure sinusoidal signal as shown in equation 10. The magnitudes and angles for each sensor are the rotating vectors mentioned above. These complex sensor values or functions thereof can be the out-of-balance parameters. Some or all of whose magnitudes can be compared against threshold criteria to determine what further control action is required as discussed above.

$$x(t) = X \cos(\omega \cdot t + \delta)$$

X = Signal amplitude $\omega$ = rotational speed in radian per second $\delta$ = phase shift in radians  (10)

The present invention utilizes signal energy in the conditioned sensor measurement as the basis for out-of-balance parameters and measurement thresholds. For the sinusoidal signal of equation 10, the signal energy is represented in equation 11 where it is also reduced to a simpler form by either carrying out the integration or applying Parseval's Theorem for periodic signals.

Continuous time representation $$E = \int_{T_0} |x(t)|^2 dt = T_0 \cdot \sum_{k=-\infty}^{\infty} |a_k|^2 \big|_{x(t)real} = 2 \cdot T_0 |a_k|^2$$

$T_0$ = period of the sinusoid $\alpha_k$ = complex Fourier Series Coefficient of $x(t) = X \angle \delta|_{k=1}$  (11)

Discrete time representation $$E = \sum_{n=\langle N \rangle} |x[n]|^2 = N \cdot \sum_{j=\langle N \rangle} |a_j|^2 = 2 \cdot N |a_j|^2$$

N = number of samples per period $\alpha_j$ = Discrete Fourier Series Coefficient of $x[n]$ Staying in the continuous time frame, the energy in one period of x(t) can be computed as a function of the rotational speed by replacing To in the continuous form of equation 11, with its inverse speed relation, as shown in equation 12.

$$T_0 = \frac{1}{f} = \frac{1}{\left(\frac{rpm}{60}\right)} = \frac{60}{rpm} \quad (12)$$

$f$ = Frequency of rotation, Hertz

-continued rpm = rotational speed, revolutions per minute $$E(rpm) = 2 \cdot \frac{60}{rpm} \cdot |a_1|^2 = \frac{120}{rpm} \cdot |a_1|^2$$

$$= \frac{120}{rpm} \cdot X^2 = \text{Energy in one period of } x(t)$$

As energy is the integration of power over time, yet the rotational speed will be changing the period of x(t), rather than look at the energy in one period of x(t), energy over a fixed time extent, $\tau$, should be considered as shown in equation 13; the result being that for a sinusoid, x(t), the signal energy over time $\tau$, independent of rotational speed, is proportional to the squared amplitude of x(t).

Define $z$ = number of $x(t)$ periods in $\tau$ $$base\_rpm = \frac{rpm}{z} \quad (13)$$

= constant speed of which all other speeds are a multiple

Then $$E(rpm)|_\tau = z \cdot \frac{120}{rpm} |a_1|^2$$

$$E(rpm)|_\tau = z \cdot \frac{120}{z \cdot base\_rpm} |a_1|^2 = \frac{120}{base\_rpm} |a_1|^2$$

$$= \frac{120}{base\_rpm} X^2$$

$E_\tau = CX^2$ where $C$ = constant

To relate this to the energy in the mechanical system, consider that this is simple periodic motion of the complex mass-spring system illustrated in FIG. 4, where we can simplify that energy is related to displacement, i.e., compression or extension of a spring. The total mechanical energy in the system is the sum of the kinetic and potential energy, which is constant in a conservative system. Given the springs within the system follows Hooke's Law where spring force is directly proportional to displacement from equilibrium, and that at maximum compression or extension the total mechanical energy is the potential energy, i.e., kinetic energy is zero, then equation 14 shows that the total mechanical energy is proportional to the squared amplitude of displacement. Associating this result with that of equation 13 then says that the measured signal energy can represent the system mechanical energy when it is representative of displacement.

$x$ = displacement of spring from rest $F = kx$ = spring force $$E_{Mech} = E_{Potential}|_{max\_x} = \int_0^X F \cdot dx = \int_0^X kx dx = \frac{1}{2} kX^2 \quad (14)$$

= total mechanical energy

For both force and acceleration measurements, conditioned and filtered as discussed above, the measurement association with displacement is shown in equation 15.

$x = X \cos(\omega t + \delta)$ = displacement

Force = $k_{sensor} \cdot x$  (15)

where
    $k_{sensor}$=spring or compression constant of active element in force sensor $$\text{Acceleration} = \frac{d^2 x}{dt} = -\omega^2 X \cos(\omega t + \delta) = -\omega^2 x$$

Thus, the utilization of signal energy in the conditioned force and acceleration sensor measurements as the basis for out-of-balance parameters and measurement thresholds, while also associating this with energy in the mechanical system, is shown in equation 16. The constants $C_F$ and $C_A$ may be used to scale the energy computations so as to emphasize, de-emphasize, or align the measurement ranges associated with a variety of sensor types or locations.

$$E_{Force} = C_F \cdot |FL\delta|^2 \quad (16)$$

$$E_{Acceleration} = C_A \cdot \left|\frac{AL\delta}{\omega^2}\right|^2$$

where $C_F$ and $C_A$ are constants

Managing energy in the measured signals of equation 16 implies maintaining physical displacement, thereby providing means to establishing thresholds through displacement, which can be directly related to perceived balance. This approach also levels the playing field for combined force and acceleration sensor measurements. This significantly impacts performance through the full range of rotational speeds.

The present invention may thus be implemented by converting the sensor measurements to their respective signal energy or displacement values. For periodic motion, this may be accomplished via simple scalar multiplication of the magnitude of the sensor measurement vectors. The signal energy or displacement values can then be compared against established energy or displacement threshold values. The scalar multiplication can be a function of other system parameters and can be used to bring all measurements into the same range of importance. Alternatively, the desired energy or displacement profile can be converted to force and acceleration values for the different rotational speeds and the sensor measurements compared directly to them.

Figure 9:
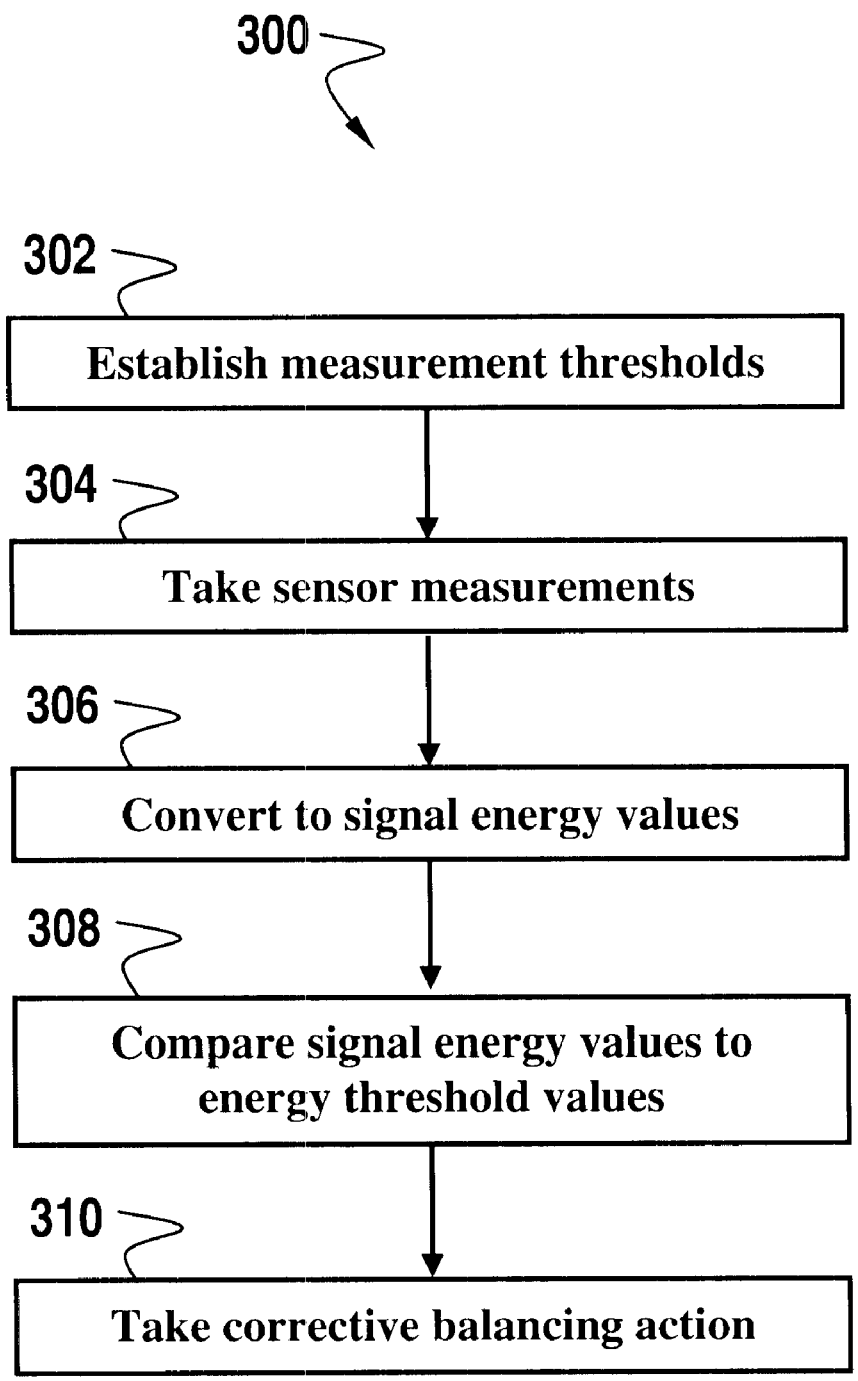
FIG. 9 depicts a high-level flow chart of operations illustrative of operational steps for measuring energy-based thresholds in accordance with preferred embodiments of the present invention.

FIG. 9 depicts a high-level flow chart 300 of operations illustrative of operational steps for measuring energy-based thresholds in accordance with preferred embodiments of the present invention. The operational steps depicted in FIG. 9 may be implemented as program code, software module or series of related software modules. Such modules may be integrated with hardware to perform particular operational functions. A "module" as known by those skilled in the computer programming arts is generally a collection of routines, subroutines, and/or data structures, which perform a particular task or implements certain abstract data types. Modules generally are composed of two sections. The first section is an interface, which compiles the constants, data types, variables, and routines. The second section is generally configured as a private feature that is accessible only by the module and which includes the source code that activates the routines in the module or modules thereof. A software implementation of the present invention may thus involve the use of such modules and/or implementation of a program product based on the operational steps illustrated in FIG. 9. Such a program product may additionally be configured as signal-bearing media, including recordable and/or transmission media.

FIG. 9 thus depicts a general methodology for dynamically balancing a rotating system utilizing energy-based threshold measurements, wherein the rotating system contains sensors therein. As indicated at block 302, measurement thresholds may be established, including energy thresholds thereof, for assessing balancing of the rotating system or rotating apparatus, such as, for example, the self-balancing rotatable apparatus described with reference to FIGS. 1 to 8 herein.

Sensor measurements may be compiled from the sensors, as illustrated at block 304. Such sensor measurements contain data indicative of the dynamics of the rotating system. As indicated thereafter at block 306, the sensor measurements may be converged to signal energy values associated with the rotating system. Thereafter, as depicted at block 308, the signal energy values may be compared to the energy threshold values to thereby determine proper balancing corrections necessary to dynamically place the rotating system in a balanced state. Following comparison of the signal energy values to the energy threshold values, corrective balancing action may be taken to dynamically place the rotating system in a balanced state as shown in block 310.

Those skilled in the art can appreciate that various alternatives to the methodology described with reference to FIG. 9 above may also be utilized in accordance with preferred embodiments of the present invention. For example, the sensor measurements may be converted to displacement values associated with the rotating system. The displacement values can then be compared to thresholds described in terms of displacement to thereby determine proper balancing corrections necessary to dynamically place the rotating system in a balanced state.

Additionally, the sensor measurements may be converted to signal energy values by scalar multiplication of a magnitude of a sensor measurement vector associated with the rotating system. The scalar multiplication may be a function of a plurality of parameters associated with the rotating system. The energy values can then be compared to thresholds described in terms of energy to thereby determine proper balancing corrections necessary to dynamically place the rotating system in a balanced state. Yet another variation to the methodologies disclosed herein can involve the conversion of the thresholds that are described in terms of energy to associated force and acceleration values. Sensor measurements can then be directly compared to these thresholds. In any case, energy is the basis for establishing out-of-balance parameters and measurement thresholds, whereas conversions are utilized for convenient implementation.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

What is claimed is:

1. A method for dynamically balancing a rotating system utilizing energy-based threshold measurements, wherein said rotating system contains sensors therein, said method comprising the steps of:

compiling sensor measurements from said sensors, wherein said sensor measurements contain data indicative of the dynamics of said rotating system;

converting said sensor measurements to signal energy values, wherein said signal energy values are associated with a mechanical energy of said rotating system;

generating a signal energy threshold profile; and comparing said signal energy values to signal energy threshold values of said signal energy threshold profile to thereby assess an immediate balance condition and determine a proper course of balancing corrections necessary to dynamically place said rotating system in a balanced state.

2. The method of claim 1 wherein the step of generating a signal energy threshold profile further comprises the step of:

generating a signal energy threshold profile, in response to compiling said signal energy values, wherein said signal energy values are associated with a range of rotational speeds, a range of balance conditions, and balance perceptions.

3. The method of claim 1 further comprising the steps of:

converting said sensor measurements to related displacement values associated with a mechanical energy of said rotating system;

converting said signal energy threshold profile to a displacement threshold profile associated with a range of rotational speeds, a range of balance conditions, and balance perceptions;

comparing said displacement values to displacement threshold values of said displacement threshold profile to thereby assess an immediate balance condition and determine a proper course of balancing corrections necessary to dynamically place said rotating system in a balanced state.

4. The method of claim 3 further comprising the steps of:

converting said displacement threshold profile into a force and acceleration threshold profile associated with a range of rotational speeds, a range of balance conditions, and balance perceptions; and comparing force and acceleration sensor measurement values to force and acceleration threshold values of said force and acceleration threshold profile to thereby determine a proper course of balancing corrections necessary to dynamically place said rotating system in a balanced state.

5. The method of claim 1, further comprising the steps of:

maintaining said sensor measurements as direct indications of the dynamics of said rotating system;

converting said signal energy threshold profile to a sensor measurement threshold profile associated with a range of rotational speeds, a range of balance conditions, and balance perceptions;

comparing sensor measurement values to sensor measurement threshold values of said sensor measurement threshold profile to thereby assess an immediate balance condition and determine a proper course of balancing corrections necessary to dynamically place said rotating system in a balanced state.

6. The method of claim 5 further comprising the steps of:

representing sensor measurement threshold profiles with force and acceleration threshold profiles associated with a range of rotational speeds, a range of balance conditions, and balance perceptions; and comparing force and acceleration sensor measurement values to force and acceleration threshold values contained in said force and acceleration threshold profile to thereby determine a proper course of balancing corrections necessary to dynamically place said rotating system in a balanced state.

7. The method of claim 1 wherein the step of converting said sensor measurements to signal energy values further comprises the step of:

converting said sensor measurements to signal energy values by scalar multiplication of a squared magnitude of a sensor measurement vector for periodic motion and force associated with said rotating system.

8. The method of claim 7 wherein said scalar multiplication is a function of a plurality of parameters associated with said sensors and rotating system.

9. The method of claim 1 wherein said rotating system comprises a washing appliance.

10. A method for dynamically balancing a rotating system utilizing energy-based threshold measurements, wherein said rotating system contains sensors therein, said method comprising the steps of:

compiling sensor measurements from said sensors, wherein said sensor measurements contain data indicative of the dynamics of said rotating system;

converting said sensor measurements to signal energy values, wherein said signal energy values are associated with a mechanical energy of said rotating system;

generating a signal energy threshold profile in response to compiling said signal energy values, wherein said signal energy values are associated with a range of rotational speeds, a range of balance conditions, and balance perceptions; and comparing said signal energy values to said signal energy threshold values of signal energy threshold profile to thereby assess an immediate balance condition and determine a proper course of balancing corrections necessary to dynamically place said rotating system in a balanced state.

11. A method for dynamically balancing a rotating system utilizing energy-based threshold measurements, wherein said rotating system contains sensors therein, said method comprising the steps of:

compiling sensor measurements from said sensors, wherein said sensor measurements contain data indicative of the dynamics of said rotating system;

converting said sensor measurements to signal energy values, wherein said signal energy values are associated with a mechanical energy of said rotating system;

generating a signal energy threshold profile in response to compiling said signal energy values, wherein said signal energy values are associated with a range of rotational speeds, a range of balance conditions, and balance perceptions; and converting said signal energy threshold profile to a sensor measurement threshold profile associated with a range of rotational speeds, a range of balance conditions, and balance perceptions;

maintaining said sensor measurements as direct indications of the dynamics of said rotating system; and representing said sensor measurement threshold profile with force and acceleration threshold profiles associated with a range of rotational speeds, a range of balance conditions, and balance perceptions; and comparing force and acceleration sensor measurement values to force and acceleration threshold values contained in said force and acceleration threshold profiles to thereby determine a proper course of balancing corrections necessary to dynamically place said rotating system in a balanced state.

12. A system for dynamically balancing a rotating device utilizing energy-based threshold measurements, wherein said rotating device contains sensors therein, said system comprising:

module for compiling sensor measurements from said sensors, wherein said sensor measurements contain data indicative of the dynamics of said rotating device;

module for converting said sensor measurements to signal energy values;

module for generating a signal energy threshold profile; and module for comparing said signal energy values to signal energy threshold values of said signal energy threshold profile to thereby assess an immediate balance condition and determine a proper course of balancing corrections necessary to dynamically place said rotating device in a balanced state.

13. The system of claim 12 wherein said signal energy values are associated with a mechanical energy of said rotating device.

14. The system of claim 12 wherein said signal energy threshold profile is generated in response to compiling said signal energy values, such that said signal energy values are associated with a range of rotational speeds, a range of balance conditions, and balance perceptions.

15. The system of claim 12 further comprising:

module for converting said sensor measurements to related displacement values associated with a mechanical energy of said rotating device;

module for converting said signal energy threshold profile to a displacement threshold profile associated with a range of rotational speeds, a range of balance conditions, and balance perceptions;

module for comparing said displacement values to displacement threshold values of said displacement threshold profile to thereby assess an immediate balance condition and determine a proper course of balancing corrections necessary to dynamically place said rotating device in a balanced state.

16. The system of claim 15 further comprising:

module for converting said displacement threshold profile into force and acceleration threshold profile associated with a range of rotational speeds, a range of balance conditions, and balance perceptions; and module for comparing force and acceleration sensor measurement values to force and acceleration threshold values of said force and acceleration threshold profile to thereby determine a proper course of balancing corrections necessary to dynamically place said rotating device in a balanced state.

17. The system of claim 12, further comprising:

module for maintaining said sensor measurements as direct indications of the dynamics of said rotating device;

module for converting said signal energy threshold profile to a sensor measurement threshold profile associated with a range of rotational speeds, a range of balance conditions, and balance perceptions;

module for comparing sensor measurement values to sensor measurement threshold values of said sensor measurement threshold profile to thereby assess an immediate balance condition and determine a proper course of balancing corrections necessary to dynamically place said rotating device in a balanced state.

18. The system of claim 17 further comprising:

module for representing sensor measurement threshold profiles with force and acceleration threshold profiles associated with a range of rotational speeds, a range of balance conditions, and balance perceptions; and module for comparing force and acceleration sensor measurement values to force and acceleration threshold values contained in said force and acceleration threshold profile to thereby determine a proper course of balancing corrections necessary to dynamically place said rotating device in a balanced state.

19. The system of claim 12 wherein said sensor measurements are converted to signal energy values by scalar multiplication of a squared magnitude of a sensor measurement vector for periodic motion and force associated with said rotating device.

20. The system of claim 19 wherein said scalar multiplication is a function of a plurality of parameters associated with said sensors and rotating device.

21. The system of claim 12 wherein said rotating devices comprises a washing appliance.

22. A system for dynamically balancing a rotating device utilizing energy-based threshold measurements, wherein said rotating device contains sensors therein, said system comprising:

module for compiling sensor measurements from said sensors, wherein said sensor measurements contain data indicative of the dynamics of said rotating device;

module for converting said sensor measurements to signal energy values, wherein said signal energy values are associated with a mechanical energy of said rotating device;

module for generating a signal energy threshold profile, in response to compiling said signal energy values, wherein said signal energy values are associated with a range of rotational speeds, a range of balance conditions, and balance perceptions; and module for comparing said signal energy values to signal energy threshold values of said signal energy threshold profile to thereby assess an immediate balance condition and determine a proper course of balancing corrections necessary to dynamically place said rotating device in a balanced state.

23. A system for dynamically balancing a rotating device utilizing energy-based threshold measurements, wherein said rotating device contains sensors therein, said system comprising:

module for compiling sensor measurements from said sensors, wherein said sensor measurements contain data indicative of the dynamics of said rotating device;

module for converting said sensor measurements to signal energy values, wherein said signal energy values are associated with a mechanical energy of said rotating device;

module for generating a signal energy threshold profile, in response to compiling said signal energy values, wherein said signal energy values are associated with a range of rotational speeds, a range of balance conditions, and balance perceptions; and module for converting said signal energy threshold profile to a sensor measurement threshold profile associated with a range of rotational speeds, a range of balance conditions, and balance perceptions;

module for maintaining said sensor measurements as direct indications of the dynamics of said rotating device; and module for representing said sensor measurement threshold profile with force and acceleration threshold profiles associated with a range of rotational speeds, a range of balance conditions, and balance perceptions; and module for comparing force and acceleration sensor measurement values to force and acceleration threshold values contained in said force and acceleration threshold profiles to thereby determine a proper course of balancing corrections necessary to dynamically place said rotating device in a balanced state.

* * * * *